(12) United States Patent
Lin

(10) Patent No.: US 7,215,834 B1
(45) Date of Patent: May 8, 2007

(54) CONGFIGURABLE IMAGE PROCESSING DRIVER

(75) Inventor: Shang-Hung Lin, San Jose, CA (US)

(73) Assignee: MagnaChip Semiconductor, Ltd., Chungcheonbuk-do (KR)

(*) Notice: Subject to any disclaimer, the term of this patent is extended or adjusted under 35 U.S.C. 154(b) by 1100 days.

(21) Appl. No.: 10/165,716

(22) Filed: Jun. 7, 2002

(51) Int. Cl.
*G06K 7/00* (2006.01)
*G06K 9/20* (2006.01)
*G06K 9/54* (2006.01)
*G06K 9/60* (2006.01)

(52) U.S. Cl. ..................... 382/312; 382/307

(58) Field of Classification Search ........... 382/312, 382/307, 232; 358/1.1, 1.15, 1.16, 1.5, 1.6; 710/10, 15, 16
See application file for complete search history.

(56) References Cited

U.S. PATENT DOCUMENTS

| 6,084,686 A * | 7/2000 | Ushida .................. 358/1.16 |
| 6,724,497 B1 * | 4/2004 | Takahashi ............... 358/1.15 |
| 7,079,712 B1 * | 7/2006 | Silverbrook et al. ...... 382/312 |
| 2002/0057852 A1 * | 5/2002 | Durbin et al. ............ 382/312 |

* cited by examiner

*Primary Examiner*—Yon J. Couso
(74) *Attorney, Agent, or Firm*—Greenberg Traurig, LLP

(57) ABSTRACT

A device driver for an image capturing device. The device driver detects and monitors characteristics of the image capturing device as well as that of a host machine processing image data coming from the device. Based on the detected and monitored characteristics, the device driver coordinates image processing on the host machine by configuring on-the-fly a plurality of functional modules supported by the host machine for performing various image processing tasks. When monitored characteristics warrants a different configuration of functional modules, the device driver on-the-fly reconfigures the functional modules.

27 Claims, 4 Drawing Sheets

CONGFIGURABLE IMAGE PROCESSING DRIVER

FIELD OF THE INVENTION

The invention relates to processing images captured by an image capturing device. Specifically, the invention relates particularly to using a driver run on a host machine to processing the captured images in accordance with the characteristics and conditions of the device and the host machine.

BACKGROUND

Image processing takes place when using an image capturing device and a host machine, wherein images captured by the device are transferred to the host machine to undergo image processing for display.

In the interplay between an image capturing device and a host machine that processes the images from the device, a gradation of architecture choices are available for allocating the load of image processing between the device and the host machine.

In one conventional design approach, the major load of image processing occurs on the device. Captured images first undergo extensive processing performed by the device before being transferred to the host machine for further processing. In another conventional design approach, the major load of image processing occurs on the host machine. Other design approaches fall somewhere in between the above two extreme approaches.

The sheer number of these possible design approaches leads to the cumbersome process of creating an image capturing device driver design per image capturing device design. Moreover, even when an image capturing device driver is created for a specific design approach, certain image processing can still expose the weakness of the driver. For example, in applications such as capturing and displaying real time streaming video, the conventional device drivers do not take into account the effect of variations associated with the interaction between the device and the host machine.

Variations can relate to static aspects and dynamic aspects of an image processing system that includes the device and the host machine. Specifically, variations in static aspects in the image processing system refer to variations of characteristics for the device and the host machine. For example, transceiver type can vary from device to device and from host machine to host machine. Also, hardware architecture can vary from host machine to host machine. On the other hand, variations in dynamic aspects of the image processing system refer to variations of real time characteristics of the device and the host machine. For example, the USB coupling bandwidth can be changing in real time, depending on whether another USB device is coupled to the host machine. The CPU of the host machine can be also executing instructions from another application. The memory and buffering capacity can vary in real time. The frame rate can vary depending on the real time requirement of the running application.

However, the quality of the displayed images suffers because a conventional driver is not able to adjust to these possible variations. Even if an image capturing device driver on the host machine can be tailored to the static characteristics of the image capturing device and the host machine, doing so for each design approach is cumbersome and impractical. Moreover, the conventional driver cannot respond properly to the dynamic variations.

BRIEF DESCRIPTION OF THE FIGURES

The accompanying drawings which are incorporated in and form a part of this specification, illustrate embodiments of the invention and together with the description, serve to explain the principles of the invention.

DETAILED DESCRIPTION

Reference is made in detail to embodiments of the invention. While the invention is described in conjunction with the embodiments, the invention is not intended to be limited by these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
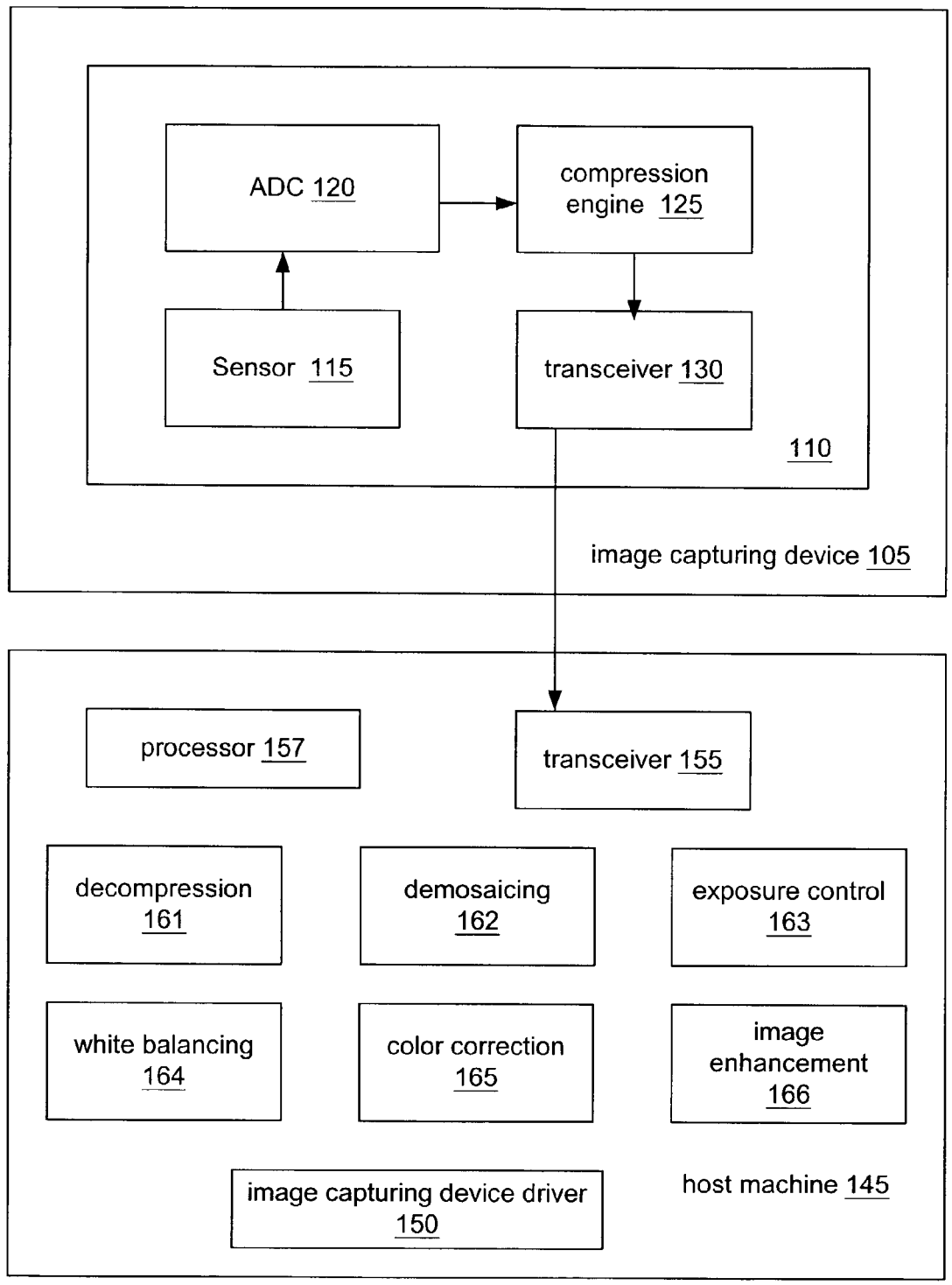
FIG. 1 shows an image processing system comprising an image capturing device and a host machine in accordance with one embodiment of the invention.

Referring now to FIG. 1, an image processing system 100 is shown in accordance with one embodiment of the invention. System 100 comprises an image capturing device 105 and a host machine 145.

Specifically, image capturing device 105 is adapted for capturing, digitizing and compressing video images to be transmitted to host machine 145. Device 105 could be, but is not limited to, a digital camcorder, a digital still camera, web cam, a video phone, a video conferencing equipment, a PC camera, or a security monitor. On the other hand, host machine 145 is adapted for receiving, decompressing and image processing the compressed image data transmitted from device 105. Moreover, host machine 145 is adapted for running an image capturing device driver 150 that orchestrates and coordinates the above decompression and image processing performed by host machine 145. Host machine 145 could be, but is not limited to, a PC, a PDA, a video phone, or any computing machine capable of performing the decompression and imaging processing in accordance with the present embodiment.

Image capturing device 105 comprises a chip 110 that comprises an image sensor 115, an analog-to-digital converter (ADC) 120, a compression engine 125 and a transceiver 130. Images are captured by sensor 115, then digitized by ADC 120 into pixel values. The pixel values are compressed by compression engine 125. The compressed pixel values are in turn transmitted to host machine 145.

As understood herein, sensor 115 could be, but is not limited to, a CMOS sensor. Also, because the implemented compression technique can be less complex than a conventional compression technique such as JPEG, compression engine 125 can have lower gate count than a conventional compression engine. Furthermore, transceiver 130 could be, but is not limited to, a USB transceiver or a wireless transceiver.

Host machine 145 comprises a transceiver 155 and a processing system 157. Transceiver 155 is adapted to receive captured image data from image capturing device 105. Transceiver 155 could be, but is not limited to, a USB transceiver or a wireless transceiver. Processing system 157 comprises one or more processors adapted to execute instructions for image processing. Processing system 157 can be any of processor architecture that enables image processing.

Host machine 145 supports functional modules for various performing image processing tasks. These functional modules comprises a decompression module 161, a demosaicing module 162, an exposure control module 162, a white balancing module 164, a color correction module 165, and an image enhancement module 166. Host machine 145 also supports image capturing device driver 150 that coordinates these functional modules in performing their image processing tasks. Upon arriving at host machine 145, the compressed image data is decompressed by decompression module 161. The decompressed image data in turn undergo various image processing performed by image processing modules 162–166.

As understood herein, a functional module supported by host machine 145 can be implemented in hardware or software. Also, the capability of host machine 145 can be adjusted. Not all functional modules need to be supported by host machine 145. Additional functional modules can be supported by host machine 145 as the need arises. For example, a compression functional module and an image recognition functional module can be supported by host machine 145. The compression functional module can be used to compress the received image data as the need arises. The image recognition functional module can be used to detect from the received image data any image movement, shape or types, such as a person's face, movement, gesture, iris movement, etc.

Figure 2:
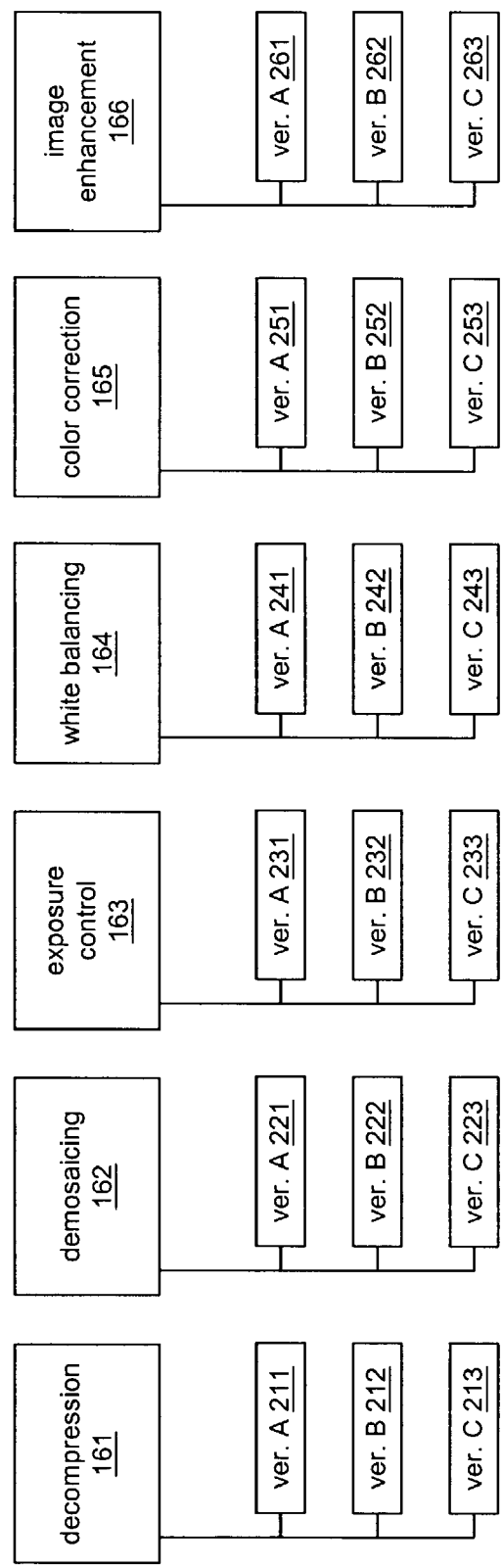
FIG. 2 shows functional modules controlled by an image capturing device driver in accordance with one embodiment of the invention.

Referring now to FIG. 2 in view of FIG. 1, functional modules 161–166, controlled by image capturing device driver 150 are shown in more detail in accordance with one embodiment of the invention.

As shown by FIG. 2, functional modules controlled by driver 150 comprise decompression module 161, demosaicing module 162, exposure control module 162, white balancing module 164, color correction module 165, and image enhancement module 166. Moreover, each of the functional module is further differentiated into multiple versions of performing its intended image processing task.

Specifically, decompression module 161 is shown to offer multiple versions of performing decompression, which comprise version A decompression 211, version B decompression 212 and version C decompression 213. Similarly, demosaicing module 162 offers versions A 221, B 222 and C 223 of performing demosaicing. Exposure control module 163 offers versions A 231, B 232 and C 233 of performing exposure control. White balancing module 164 offers versions A 241, B 242 and C 243 of performing white balancing. Color correction module 165 offers versions A 251, B 252 and C 253 of performing color correction. Image enhancement module 166 offers versions A 261, B 262 and C 263 of performing image enhancement.

As understood herein, these functional modules as shown are not meant to be exhaustive of the functional modules that can be supported by driver 150. For example, in another embodiment, additional functional modules (such as the compression and image recognition modules mentioned above) are controlled by driver 150. Also, not all of these functional modules need to be supported by driver 150. For example, in yet another embodiment, not all of the shown functional modules need to be supported by driver 150.

Moreover, as understood herein, driver 150 does not require the number of versions supported by each functional module to be fixed. That is, for each functional module, versions can be deleted from or added to the existing supported versions. As such, the number of versions supported by a functional module need not be equal to the number of versions supported by another functional module.

Figure 3:
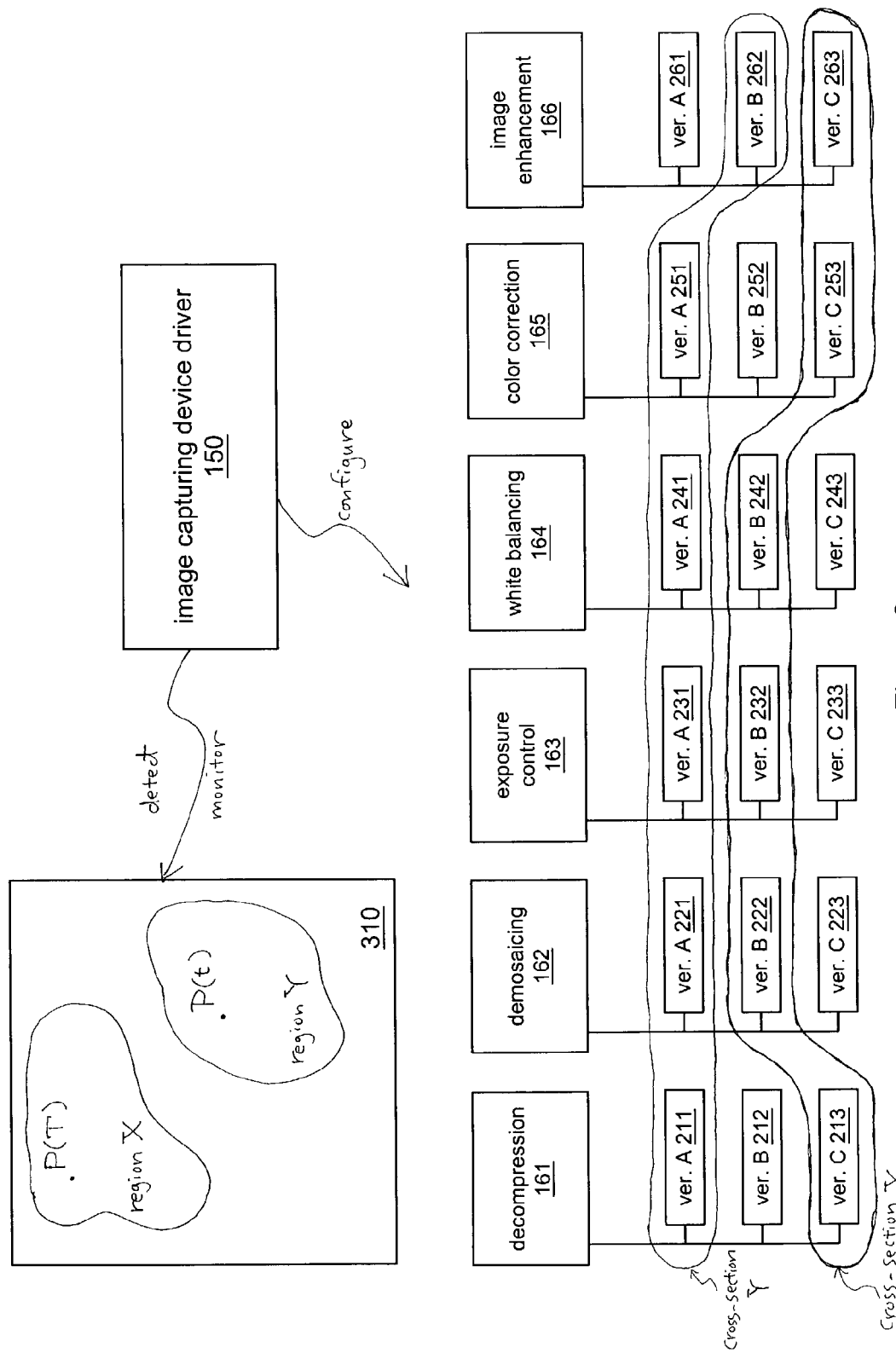
FIG. 3 shows an abstract view of some functions as performed by an image capturing device driver in accordance with one embodiment of the invention.

Referring now to FIG. 3 in view of FIGS. 1 and 2, an abstract view of some functions as performed by image capturing device driver 150 is presented in accordance with one embodiment of the invention. The abstract view is presented to facilitate description of driver 150, wherein driver 150 can be thought to orchestrate a configuration of imaging processing functional modules (161–166) that are working in concert to perform the tasks of image processing system 100.

Specifically, as shown, current state of image processing system 100 at time T is represented abstractly by a point P(T) in a multi-dimensional state space 310 in order to facilitate description of driver 150. In other words, the characteristics and states of device 105 and host machine 145 at time T can be represented as point P(T) in state space 310.

Dimensions of state space 310 can comprise CPU capability of host machine 145, algorithmic complexity of compression technique implemented by device 105, type of coupling between device 105 and host machine 145. As such, P(T) can be used to represent the static and architectural aspects of image processing system 100.

Moreover, dimensions of state space 310 can comprise frame rate required by an application running on host machine 145, available bandwidth between device 105 and host machine 145, buffering capacity of host machine 145 and processing load of the CPU of host machine 145. As such, a point such as P(T) in state space 310 can also be used to represent a real time "snap shot" (at time T) of the dynamic states of device 105 and host machine 145 within image processing system 100. The position of P(t), the point at a later time t in state space 310, can represent new dynamic state of image processing system 100 as image processing takes place.

Referring still to FIG. 3, Driver 150 at time T is adapted to detect the static aspects of image process system 100 as represented by the position of a current point P(T) in state space 310. Driver 150 is also adapted to detect the dynamic aspects of image processing system 100 as represented by point P(T). Driver 150 is adapted to automatically and on-the-fly reconfigure the image processing modules (161–166) if a change of image processing system warrants the reconfiguration. That is, if at a later time t, the point P(t) in state space 310 indicates that the characteristics of device 105 and host machine 145 have changed sufficiently enough to warrant a different configuration of functional modules 161–166 for image processing.

Based on the detected position of P(T), driver 150 selects a "cross-section" from the collection of functional modules shown in FIG. 3. As shown, by selecting a cross-section from the collection of functional modules 161–166, driver 150 selects a version from each supported functional module, thereby resulting in selecting a cross-section of the collection of functional modules. As such, a cross-section in this sense comprises a collection of six versions supported respectively by functional modules 161–166. (As understood herein, the number of versions in a cross-section is equal to the number of functional modules being controlled by driver 150 in performing imaging processing. As such, if the number of functional modules being controlled by driver 150 changes, the number of versions in a cross-section also changes.)

Moreover, as the condition of image processing system 100 changes in real time, driver 150 monitors the position of the current point in state space 310. In turn, driver 150 can select on-the-fly a new cross-section from the collection of functional modules 161–166 if the new state of image processing system 100 warrants a different level of image processing. In so doing, driver 150 ensures that the appropriate image processing can be performed, thereby balancing the need to achieve high image quality and the need to stay within processing limitations of image processing system 100.

Referring still to FIG. 3, in the present embodiment, state space 310 can be thought of as comprising different regions, each of which is assigned a cross-section in the collection of functional modules 161–166. As the point in state space 310 moves from P(T) in a region X at time T to P(t) in another region Y at time t, driver 150 is adapted to replace the cross-section (cross-section X) corresponding to region X with the cross-section (cross-section Y) corresponding to region Y. For illustration purpose, cross-section X as shown includes decompression version C 213, demosaicing version B 222, exposure control version B 232, white balancing version B 242, color correction version C 253 and image enhancement version C 263. Cross-section Y as shown includes decompression version A 211, demosaicing version A 221, exposure control version A 231, white balancing version A 241, color correction version A 251 and image enhancement version B 262. Cross-sections X and Y represent respectively two different configurations of image processing as coordinated by driver 150.

For example, if the current point from position P(T) in region X (associated with cross-section X) moves to position P(t) in region Y (associated with cross-section Y) of state space 310, driver 150 on-the-fly replaces cross-section X with cross-section Y for performing image processing.

As understood herein, these different regions can take on various sizes. A region can even include just a single point. Moreover, these different regions can have overlaps. In the scenario where the current point lies in the overlap of two different regions in state space 310, driver 150 is adapted to select a cross-section based on additional considerations.

Figure 4:
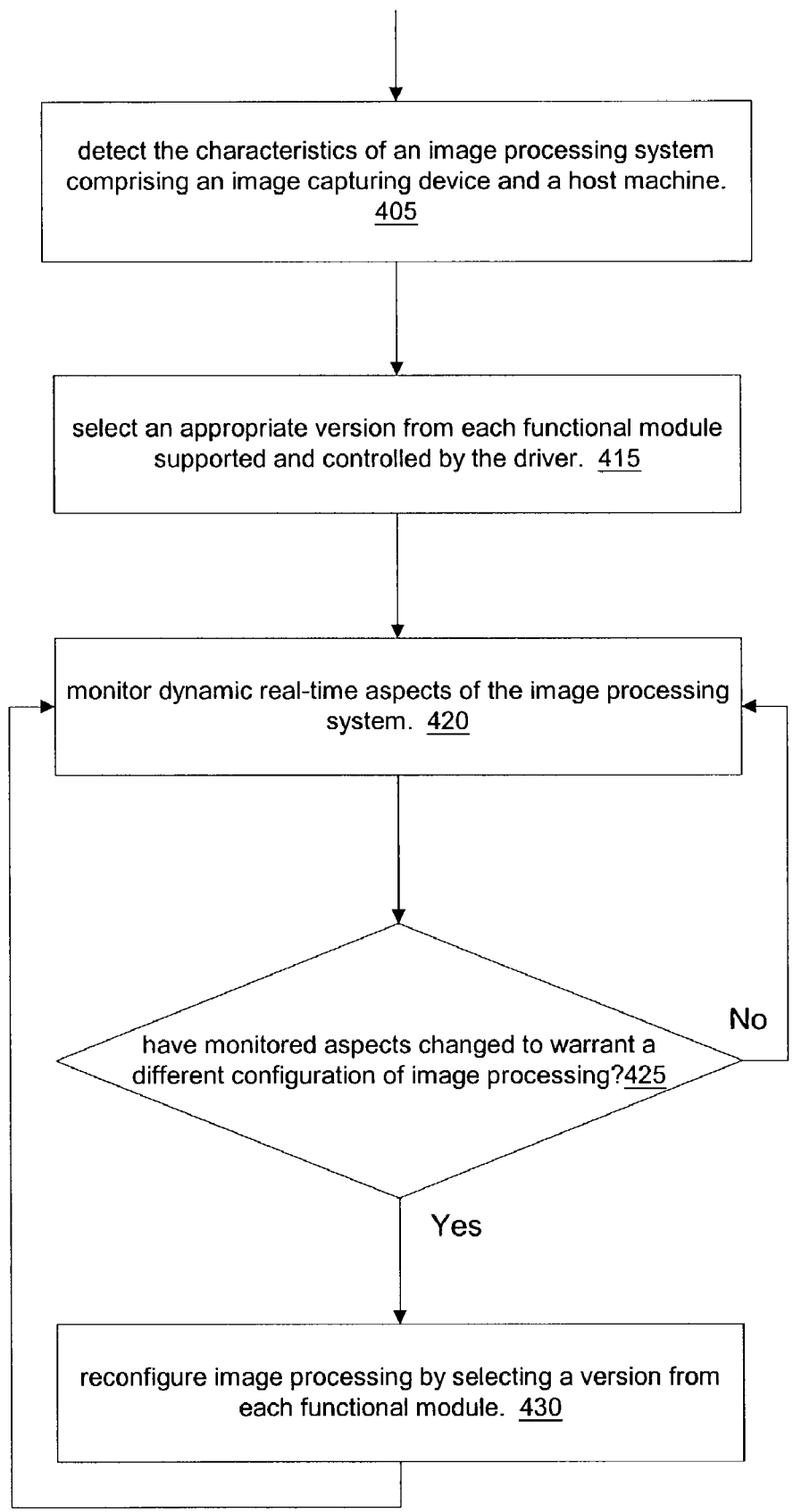
FIG. 4 is a flow chart outlining steps performed by an image capturing device driver in accordance with one embodiment of the invention.

Referring now to FIG. 4, a flow chart 400 is shown outlining the steps performed by an image capturing device driver in accordance with one embodiment of the invention.

In step 405, the driver detects the characteristics of an image processing system comprising an image capturing device and a host machine that is running the driver. These characteristics can relate to static aspects of the system, such as compression algorithm used, computer architecture of the host machine, and type of coupling between the device and the host machine (e.g., USB, wireless, etc.). These characteristics can also relate to dynamic (real-time) aspects of the system, such as frame rate required by an application from moment to moment, coupling bandwidth currently available, and current buffer usage and CPU workload.

In step 415, the driver selects an appropriate version from each functional module supported and controlled by the driver. These functional modules comprise a decompression module, a demosaicing module, an exposure control module, a white balancing module, a color correction module, and an image enhancement module. Each of these functional module can support multiple versions of performing the function indicated by the functional module. By selecting a version from each functional module, the driver can be thought to select a "cross-section" from the collection of functional modules.

As understood herein, the driver need not perform version selection for each functional module. For example, in another embodiment, a default version for a functional module is used without the driver making a version selection. Moreover, functional modules supported by the host machine can be added or deleted as the need arises.

In step 420, the driver monitors dynamic real-time aspects of the image processing system.

In query step 425, a check is made to see if the monitored aspects have changed enough to warrant a different configuration of image processing. If no, step 420 is performed again. If yes, then step 430 is performed.

In step 430, the driver responds in real time by selecting on-the-fly the appropriate cross-section from the collection of functional modules. The driver selects on-the-fly a version from each functional module. That is, the driver reconfigures image processing by selecting a version from each functional module. In so doing, a balance is struck between the need to create quality images and the need to stay within the limitation of the image processing system. Step 420 is next performed.

Again, as understood herein, in step 430, the driver need not perform version selection for each functional module. For example, in another embodiment, a default version for a functional module is used without the driver making a version selection.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method for processing images at an image capturing device driver comprising:
   at the image capturing device driver, detecting characteristics of an image capturing device and a host machine;
   in response to said detected characteristics, configuring a plurality of image processing functional modules supported by said host machine for imaging; and
   processing captured images, wherein each of said functional modules is adapted to support its intended function in multiple versions of performing its said intended function.

2. The method of claim 1 further comprising:
   monitoring real time characteristics of said image capturing device and said host machine; and in response to said monitored real time characteristics providing a different configuration of said plurality of functional modules, reconfiguring said plurality of functional modules for image processing said captured images.

3. A method for processing images at an image capturing device driver comprising:

detecting characteristics of an image capturing device and a host machine;

in response to said detected characteristics, configuring a plurality of image processing functional modules supported by said host machine for imaging; and processing captured images, wherein each of said functional modules is adapted to support its intended function in multiple versions of performing its said intended function, wherein said functional modules comprise: a compression module adapted to support multiple versions of performing compression, a decompression module adapted to support multiple versions of performing decompression, an image recognition module adapted to support multiple versions of performing image recognition, a demosaicing module adapted to support multiple versions of performing demosaicing, a exposure control module adapted to support multiple versions of performing exposure control, a white balancing module adapted to support multiple versions of performing white balancing, a color correction module adapted to support multiple versions of performing color correction, and an image enhancement module adapted to support multiple versions of performing image enhancement.

4. A method for processing images at an image capturing device driver comprising:

detecting characteristics of an image capturing device and a host machine including compression methodology used by said image capturing device, CPU architecture of said host machine, and coupling bandwidth between said device and said host machine;

in response to said detected characteristics, configuring a plurality of image processing functional modules supported by said host machine for imaging; and processing captured images, wherein each of said functional module is adapted to support its intended function in multiple versions of performing its said intended function.

5. A method for processing images at an image capturing device driver comprising:

detecting characteristics of an image capturing device and a host machine;

in response to said detected characteristics, configuring a plurality of image processing functional modules supported by said host machine for imaging;

processing captured images, wherein each of said functional module is adapted to support its intended function in multiple versions of performing its said intended function;

monitoring real time characteristic of said image capturing device and said host machine including CPU workload of said host machine, available coupling bandwidth between said device and said host machines, available buffer of said host machine, and frame rate required by an application running on said host machine;

in response to said monitored real time characteristics, providing a different configuration of said plurality of functional modules, reconfiguring said plurality of functional modules for image processing said captured images.

6. The method of claim 1, wherein said image capturing device is coupled to said host machine using USB protocol.

7. The method of claim 1, wherein said image capturing device is coupled to said host machine using a wireless protocol.

8. The method of claim 1, wherein in said step of configuring a version of each said functional modules is selected.

9. The method of claim 2, wherein in said step of providing a different configuration a version of each said functional modules is selected.

10. An image capturing device comprising:

a sensor adapted to capture image data; and a transceiver adapted to transfer said captured image data to a host machine for image processing, wherein said host machine supports a device driver of said image capturing device, said driver adapted to detect characteristics of said image capturing device and said host machine and to coordinate image processing of said captured image data by configuring a plurality of image processing functional modules supported by said host machine in response to said detected characteristics of said device and said host machine.

11. The image capturing device of claim 10, wherein said driver is, adapted to monitor real time characteristics of said image capturing device and said host machine, said driver adapted to coordinate image processing of said captured image data by reconfiguring said plurality of image processing function modules in response to said monitored real time characteristics providing a different configuration of said plurality of functional modules for image processing said captured image data.

12. An image capturing device comprising:

a sensor adapted to capture image data; and a transceiver adapted to transfer said captured image data to a host machine for image processing, wherein said host machine supports a device driver of said image capturing device, said driver adapted to detect characteristics of said image capturing device and said host machine and to coordinate image processing of said captured image data by configuring a plurality of image processing functional modules comprising a compression module adapted to support multiple versions of performing, compression, a decompression module adapted to support multiple versions of performing decompression, an image recognition module adapted to support multiple versions of performing image recognition, a demosaicing module adapted to support multiple versions of performing demosaicing, a exposure control module adapted to support multiple versions of performing exposure control, a white balancing module adapted to support multiple versions of performing white balancing, a color correction module adapted to support multiple versions of performing color correction, and an image enhancement module adapted to support multiple versions of performing image enhancement in response to said detected characteristics of said image capturing device and said host machine.

13. An image capturing device comprising:

a sensor adapted to capture image data; and a transceiver adapted to transfer said captured image data to a host machine for image processing, wherein said host machine supports a device driver of said image capturing device, said driver adapted to detect characteristics of said image capturing device and said host machine comprising compression methodology used by said device, CPU architecture of said host machine, and coupling bandwidth between said device and said host machine and said driver adapted to coordinate image processing of said captured image data by configuring a plurality of image processing functional modules in response to said detected characteristics of said image capturing device and said host machine.

14. An image capturing device comprising:
a sensor adapted to capture image data; and
a transceiver adapted to transfer said captured image data to a host machine for image processing, wherein said host machine supports a device driver of said image capturing device, said driver adapted to detect characteristics of said image capturing device, to monitor real time characteristics of said image capturing device and said host machine comprising CPU workload of said host machine, available coupling bandwidth between said device and said host machine; available buffer of said host machine, and frame rate required by an application running on said host machine, and the said driver adapted to coordinate image processing of said captured image data by configuring a plurality of image processing functional modules supported by said host machine in response to said real time characteristics of said device and said host machine.

15. The image capturing device of claim 10, wherein said image capturing device is coupled to said host machine using USB protocol.

16. The image capturing device of claim 10, wherein said image capturing device is coupled to said host machine using a wireless protocol.

17. The image capturing device of claim 10, wherein when configuring said plurality of functional modules for image processing said capture image data, a version of each said functional modules is selected by said driver.

18. The image capturing device of claim 11, wherein when reconfiguring said plurality of functional modules for image processing said capture image data, a version of each said functional modules is selected by said driver.

19. An image processing machine, said machine comprising:
a transceiver adapted for receiving image data captured by an image a device; and
a processing system coupled to said transceiver, said processing system adapted for running a plurality of functional modules for image processing said captured image data, wherein each functional module is adapted to support multiple versions of performing its intended image processing function, said processing system adapted to run an image capturing device driver adapted to detect characteristics of said machine and said image capturing device and configure said plurality of functional modules for image processing according to the detected characteristics of said machine and said device.

20. The machine of claim 19, wherein said driver is adapted to monitor real time characteristics of said image capturing device and said host machine, said driver adapted to coordinate image processing of said captured image data by reconfiguring said plurality of image processing function modules in response to said monitored real time characteristics providing a different configuration of said plurality of functional modules for image processing said captured image data.

21. An image processing machine, said machine comprising:
a transceiver adapted for receiving image data captured by an image a device; and
a processing system coupled to said transceiver, said processing system adapted for running a plurality of functional modules for image processing said captured image data, wherein each functional module is adapted to support multiple versions of performing its intended image processing function, said processing system adapted to run an image capturing device driver adapted to detect characteristics of said machine and said image capturing device, and to configure said plurality of functional modules for image processing according to the detected characteristics of said machine and said device, wherein said functional modules comprise: a compression module adapted to support multiple versions of performing compression, a decompression module adapted to support multiple versions of performing decompression, an image recognition module adapted to support multiple versions of performing image recognition, a demosaicing module adapted to support multiple versions of performing demosaicing, a exposure control module adapted to support multiple versions of performing exposure control, a white balancing module adapted to support multiple versions of performing white balancing, a color correction module adapted to support multiple versions of performing color correction, and an image enhancement module adapted to support multiple versions of performing image enhancement.

22. An image processing machine, said machine comprising:
a transceiver adapted for receiving image data captured by an image a device; and
a processing system coupled to said transceiver, said processing system adapted for running a plurality of functional modules for image processing said captured image data, wherein each functional module is adapted to support multiple versions of performing its intended image processing function, said processing system adapted to run an image capturing device driver adapted to detect characteristics of said machine and said image capturing device, and to configure said plurality of functional modules for image processing according to the detected characteristics of said machine and said device, wherein said detected characteristics comprise: compression methodology used by said device, CPU architecture of said host machine, and coupling bandwidth between said device and said host machine.

23. An image processing machine, said machine comprising:
a transceiver adapted for receiving image data captured by an image a device; and
a processing system coupled to said transceiver, said processing system adapted for running a plurality of functional modules for image processing said captured image data, wherein each functional module is adapted to support multiple versions of performing its intended image processing function, said processing system adapted to run an image capturing device driver adapted to detect characteristics and monitor real time characteristics of said machine and said image capturing device, and to configure said plurality of functional modules for image processing according to the monitored real time characteristics of said machine and said device, wherein said monitored real time characteristics comprise: CPU workload of said host machine, available coupling bandwidth between said device and said host machine, available buffer of said host machine, and frame rate required by an application running on said host machine.

24. The machine of claim 19, wherein said image capturing device is coupled to said host machine using USB protocol, and wherein said transceiver uses USB protocol.

25. The machine of claim 19, wherein said image capturing device is coupled to said host machine using a wireless protocol, and wherein said transceiver uses the wireless protocol.

26. The machine of claim 19, wherein when configuring said plurality of functional modules for image processing said capture image data, a version of each said functional modules is selected by said driver.

27. The machine of claim 20, wherein when reconfiguring said plurality of functional modules for image processing said capture image data, a version of each said functional modules is selected by said driver.

* * * * *

UNITED STATES PATENT AND TRADEMARK OFFICE
CERTIFICATE OF CORRECTION

PATENT NO. : 7,215,834 B1 Page 1 of 1
APPLICATION NO. : 10/165716
DATED : May 8, 2007
INVENTOR(S) : Shang-Hung Lin It is certified that error appears in the above-identified patent and that said Letters Patent is hereby corrected as shown below:

Title Page
Item (54)
Change "Congfigurable" to read -- Configurable --

Column 1, Title
Change "Congfigurable" to read -- Configurable --

Column 7, line 23
Change "a" to read -- an --

Column 8, line 52
Change "a" to read -- an --

Column 10, line 24
Change "a" to read -- an --

Signed and Sealed this

Eleventh Day of September, 2007

JON W. DUDAS
*Director of the United States Patent and Trademark Office*